United States Patent
Tanaka et al.

(10) Patent No.: US 7,294,362 B2
(45) Date of Patent: Nov. 13, 2007

(54) AQUEOUS AGENT FOR TREATING SUBSTRATE, METHOD FOR TREATING SUBSTRATE AND TREATED SUBSTRATE

(75) Inventors: Kazuya Tanaka, Tokyo (JP); Akio Shimizu, Tokyo (JP); Ryoji Morita, Tokyo (JP); Shinya Tsuchida, Tokyo (JP); Nobuyuki Kobayashi, Tokyo (JP); Takanori Sannan, Tokyo (JP)

(73) Assignees: Nihon Parkerizing Co., Ltd., Tokyo (JP); Dainichieseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/500,892

(22) PCT Filed: Jan. 10, 2003

(86) PCT No.: PCT/JP03/00176

§ 371 (c)(1),
(2), (4) Date: Jul. 7, 2004

(87) PCT Pub. No.: WO03/060190

PCT Pub. Date: Jul. 24, 2003

(65) Prior Publication Data

US 2005/0103229 A1     May 19, 2005

(30) Foreign Application Priority Data

Jan. 11, 2002   (JP) .............................. 2002-004905

(51) Int. Cl.
*B05D 3/02*   (2006.01)
(52) U.S. Cl. ................ 427/372.2; 427/384; 427/388.4
(58) Field of Classification Search .................... None
See application file for complete search history.

(56) References Cited

U.S. PATENT DOCUMENTS 4,267,313 A * 5/1981 Sannan et al. ............... 536/20
4,528,283 A * 7/1985 Lang et al. .................... 514/55
5,348,799 A * 9/1994 Boston ........................ 428/323
5,769,967 A * 6/1998 Dolan .......................... 148/247
6,508,958 B1 * 1/2003 Wojcik ................... 252/389.21
6,858,312 B2 * 2/2005 Kobayashi et al. ......... 428/457

FOREIGN PATENT DOCUMENTS

| BE | 821346 | | 2/1975 |
| EP | 153973 | * | 9/1985 |
| EP | 952193 | | 10/1999 |
| EP | 1205523 | * | 5/2002 |
| JP | 60-233102 | * | 11/1985 |
| JP | 07-190676 | * | 7/1995 |
| JP | 07-229063 | * | 8/1995 |
| JP | 11-293149 | * | 10/1999 |
| JP | 2000-309879 | * | 11/2000 |
| WO | 01/12341 | | 2/2001 |
| WO | WO 02/06410 | * | 1/2002 |

OTHER PUBLICATIONS

El-sawy et al, Anti-Corrosion Methods and Materials, 48(4), pp. 227-234, 2001.*
Kobayashi et al, Bokin Bobai, 23(12), pp. 741-744, 1995.*
Kobayashi et al, Bokin Bobai 24(1), pp. 33-37, 1996.*
Wang et al, Guangpuzue Yu Guangpu Fenxi, 19(6), pp. 817-820, 1999.*
Sugama et al, Journal of Materials Science, 34, pp. 2003-2014, 1999.*
Hon et al, Journal of Applied Polymer Science, 77, pp. 2246-2253, 2000.*

* cited by examiner

*Primary Examiner*—Erma Cameron
(74) *Attorney, Agent, or Firm*—Oblon, Spivak, McClelland, Maier & Neustadt, P.C.

(57) ABSTRACT

Water-based, substrate treatment compositions contain (A) at least one chitosan selected from chitosan and a chitosan derivative, and (B) a metal compound containing at least one metal selected from Ti, Zr, Hf, Mo, W, Se, Ce, Fe, Cu, Zn, V and trivalent Cr. In particular, the water-based, substrate treatment compositions can improve the interlayer adhesion between metal materials and resin coating layers such as films or coatings, and can also improve the corrosion resistance and solvent resistance of such metal materials.

7 Claims, No Drawings

AQUEOUS AGENT FOR TREATING SUBSTRATE, METHOD FOR TREATING SUBSTRATE AND TREATED SUBSTRATE

TECHNICAL FIELD

This invention relates to water-based, substrate treatment compositions and a substrate treatment method, which are useful in a wide range of fields such as household electric and electronic appliances, foods and buildings, are applicable to metal materials such as aluminum, magnesium, copper, iron, zinc, nickel and alloys thereof, and especially, are usable to improve the interlayer adhesion between various resin coating layers, which are arranged on surfaces of metal materials, and the metal materials, the solvent resistance of the resin coating layers and the corrosion resistance of the metal materials; and also to treated substrates. More specifically, the present invention is concerned with water-based, substrate treatment compositions and a substrate treatment method, which can provide materials—said materials being to be finally coated with resin coating layers by coating, film lamination, printing or the like—with high adhesive properties such that the resin coating layers such as coatings or films will not separate even after application of extensive forming and can also impart corrosion resistance and solvent resistance to the resulting articles (formed products); and also with treated materials.

BACKGROUND ART

Many of metal materials, such as aluminum, magnesium, iron, copper, zinc, nickel and alloys thereof, are widely used as parts and components for automobiles, parts and components for household electric and electronic appliances, construction materials, beverage containers and like after providing their surfaces with various resin coating layers to improve their protection performance and external attractiveness and then applying extensive forming to them as mentioned above.

A variety of properties are required upon using metal materials in the above-mentioned fields. To meet such property requirements, diverse resin coating layers are applied to the surfaces of the metal materials depending on their application purposes. As methods for forming such resin coating layers, methods such as coating, film lamination and printing can be mentioned. Basically speaking, excellent corrosion resistance, interlayer adhesion and solvent resistance (waterproofness) of materials are properties required not only in the field of metals but also in other fields.

Upon coating a material such as a metal, the material is coated on a surface thereof, for example, with a solvent-based coating composition, water-based coating composition or powder coating composition, and is then dried at room temperature or under heat to form a coating (resin coating layer) on the surface such that the coating composition is allowed to exhibit functions which the coating composition is inherently equipped with. Solvent-based coating compositions have been used widely for many years. With a view to reducing the pollutant load on the environment, however, there is an increasing move toward water-based coating compositions or powder coating compositions or a method making use of films such as lamination or the like. Nonetheless, coating methods making use of solvent-based coating compositions are still used these days in a large majority of fields.

Especially in the substrate treatment (which may hereinafter be called "priming") of metal materials, chromate treatment making use of chemicals, which contain hexavalent chromium, has been used widely for many years for its economy. In recent years, however, there is an ever-increasing move on a worldwide level toward not only reductions in the influence to the human body but also global environmental conservation, such as the regulations on use of toxic metals (compounds, ions) such as hexavalent chromium, lead and cadmium in Europe and the PRTR (Pollutant Release and Transfer Register) and the disclosure of a listing of environmental hormone substances in Japan.

Under the circumstances as described above, there is ever-increasing recognition of a crisis about adverse effects on the human body and environment. Many technologies capable of substituting for hexavalent chromium which is generally used as a surface treatment composition, that is, many substrate treatment compositions for metal materials, said compositions making absolutely no use of hexavalent chromium, have been proposed accordingly. Substrate treatment compositions free of hexavalent chromium include those containing as principal components organic compounds such as water-soluble resins or emulsion resins, those containing as principal components inorganic compounds of metals other than hexavalent chromium or heavy metals, and composite-type ones containing both of the components. Also known are substrate treatment techniques making use of these substrate treatment compositions and metal materials subjected to such substrate treatments. Further, such substrate treatment methods include "chemical conversion treatments" in each of which a substrate treatment composition and a metal materials are chemically reacted with each other, "dry-in-place treatments" in each of which a substrate treatment composition itself is subjected to a chemical reaction by causing a solvent to evaporate under heat, and "electrolysis treatments" in each of which electricity is fed from an external power source to a metal material to subject it to a chemical reaction.

In particular, chemical conversion treatments and coating treatments are economically advantageous as they do not use electricity. With respect to the components of substrate treatment compositions, many conventional substrate treatment compositions are known to contain inorganic compounds as principal components and are also using organic compounds in combination to supplement properties not satisfied by the inorganic compounds. For example, JP 11-350157 A discloses a substrate treatment composition which is composed of an Al-phosphoric acid compound, at least one of Mn, Mg, Ca and Sr compounds, a sol of $SiO_2$, and a particular water-based organic resin emulsion or water-soluble resin.

JP 10-1789 A discloses a substrate treatment composition containing an organic high-molecular compound, such as a nitrogen-containing acrylic resin, urethane resin, phenolic resin, olefin resin or amide resin, and polyvalent anions in specific amounts; a substrate treatment method; and treated metal materials. Further, JP 10-46101 A discloses a coated metal material the surface of which has been treated with a water-based treatment composition containing a particular phenolic resin in combination with a phosphoric acid compound and an organosilicon compound; and a production process thereof.

In addition, JP 11-140691 A contains a disclosure about a substrate treatment method, a treated steel plate, and a steel plate making use of the treated steel plate and coated with a thermoplastic resin. Concerning the treatment of a substrate, it also discloses a technique in which the substrate is treated with a silane coupling agent. Furthermore, JP 8-27595 A discloses a treatment method which comprises controlling the temperature of a phosphate salt, water-soluble resin and surfactant of specific concentrations to a specific temperature, immersing an aluminum alloy plate, and applying cathodization and anodization in combination.

The above techniques are described as applied to metal materials subjected to specific treatments by methods such as electrolysis, chemical conversion treatment or coating, or as applied to resin-coated metal materials obtained by laminating films on the metal materials or coating the metal materials. However, all of these metal materials are those applied with treatment compositions which are free of hexavalent chromium, and the resin coating layers of these metal materials are insufficient in all of durable adhesive properties, solvent resistance and the corrosion resistance of the metal material under severe environments. Electrolytic methods, on the other hand, require substantial energy cost, and are not preferred economically. Under the current circumstances, there is accordingly no technique that uses a substrate treatment composition free of hexavalent chromium and can provide a satisfactory metal material excellent in the adhesive properties and solvent resistance of its resin coating layer and in corrosion resistance.

An object of the present invention is, therefore, to overcome the above-described various problems of the conventional art, and to provide a water-based, substrate treatment composition and a substrate treatment method, which can improve especially the interlayer adhesion between a metal material and a resin coating layer such as a film or coating, the solvent resistance of the resin coating layer and the corrosion resistance of the metal material or the like, and also a treated material.

DISCLOSURE OF THE INVENTION

To achieve the above-described object, the present inventors have proceeded with an extensive investigation. As a result, it has been found that a material, especially a metal material subjected to substrate treatment with a water-based, substrate treatment composition, which contains a chitosan and a specific metal compound, by a desired method has excellent interlayer adhesion between the metal material and its resin coating layer, excellent solvent resistance and superb corrosion resistance even when subjected to forming after coating or film lamination, leading to the completion of the present invention.

Described specifically, the present invention provides a water-based, substrate treatment composition, which contains (A) at least one chitosan selected from chitosan and a chitosan derivative and (B) a metal compound containing at least one metal selected from Ti, Zr, Hf, Mo, W, Se, Ce, Fe, Cu, Zn, V and trivalent Cr.

The water-based, substrate treatment composition according to the present invention is particularly useful for the treatment of a metal material as a substrate. It is preferable that the chitosan derivative may be chitosan, carboxymethylchitosan, a cationized chitosan, a hydroxyalkylchitosan, and/or a salt thereof; the chitosan derivative may be glycerylated chitosan and/or a salt thereof; the metal compound (B) may be a metal compound containing trivalent Cr, Ti, Zr, V, Mo or Ce; and the water-based, substrate treatment composition according to the present invention may further contain (C) an organic compound containing at least one carboxyl group in a molecule thereof.

Further, the present invention also provides a substrate treatment method, which comprises coating a material, which is to be treated, at a surface thereof with any one of the above-described water-based, substrate treatment compositions, optionally rinsing the surface of the material with water subsequent to the coating, and, preferably immediately, heating and drying the material in a temperature range of from 80° C. to 300° C.; and a metal material subjected as a substrate to treatment by the method. The material may preferably be a metal material such as aluminum, magnesium, copper, iron, zinc, nickel, or an alloy thereof. In the substrate treatment method, a dry coat weight of the chitosan (A) to the surface of the treated material may preferably be in a range of from 1 to 500 mg/m$^2$ calculated as chitosan, and a dry coat weight of the metal compound (B) to the surface of the treated material may be in a range of from 1 to 500 mg/m$^2$ calculated as the metal.

BEST MODES FOR CARRYING OUT THE INVENTION

The present invention will next be described in further detail based on certain preferred embodiments.

A description will be made firstly about the chitosan (A) contained in the water-based, substrate treatment composition according to the present invention. Chitosan useful in the present invention can be obtained by subjecting chitin, which is a natural high-molecular substance extracted from shellfish such as crab, shrimp or lobster, to 60 to 100 mole % deacetylation. For example, chitosan which has been deacetylated 100 mole % is a high-molecular substance formed of D-glucosamine bonded at the 1-position and 4-position thereof.

The chitosan derivative is a reaction product obtained by carboxylating, glycolizing, tosylating, sulfating, phosphatizing, etherifying or alkylating hydroxyl groups and/or amino groups of chitosan. Specific examples include chitosan, carboxymethoxychitosan, hydroxyethylchitosan, hydroxypropylchitosan, hydroxybutylchitosan, glycerylated chitosan, and these salts with acids.

Examples of the chitosan derivative also include reaction products each obtained by newly introducing tertiary or quaternary amino groups into chitosan by using a compound which contains a tertiary or quaternary amino group or both of them, so-called cationized chitosans each obtained by directly alkylating amino groups of chitosan with an alkylating agent such that chitosan is directly tertiarized or quaternized to contain tertiary or quaternary amino groups or both of them in the molecule thereof, and these salts with acids.

Among the above-described chitosan derivatives, glycerylated chitosan and/or these salts with acids are particularly recommended from the standpoint of the adhesion between metal materials and resin coating layers. As the synthesis process and conditions for the chitosan derivatives, any process and conditions known to date can be employed. Upon introduction of substituent groups onto chitosan, the degree of introduction of substituent groups may preferably be in a range up to 6.0 at the maximum based on the monomer unit (N-acetyl-β-D-glucosamine) in chitosan. A degree of introduction of substituent groups greater than 6.0 develops such an inconvenience that severer reaction conditions will be required for obtaining the chitosan derivative or an undercoat formed from the substrate treatment composition according to the present invention will be provided with deteriorated waterproofness.

Examples of the above-described compound with tertiarized or quaternized amino groups contained therein include 2-chloroethyldiethylamine and its hydrochloride salt, 3-chloro-2-hydroxypropyldiethylamine, 2,3-epoxypropyldimethylamine, trimethyl-3-chloro-2-hydroxypropyltrimethylammonium chloride, and 2,3-epoxypropyltrimethylammonium chloride. Illustrative of the alkylating agent for directly alkylating amino groups are methyl iodine and ethyl iodine.

The chitosan (A) may contain some byproducts formed by the reaction, and also unreacted substances. It may be in the form of powder or in the form of an aqueous solution. The weight average molecular weight of the chitosan (A) may preferably be from 1,000 to 2,000,000, with a range of from 10,000 to 1,000,000 being more preferred. A weight average molecular weight lower than 1,000 may not be able to provide an undercoat, which is formed by using the substrate treatment composition according to the present invention, with sufficient toughness. A weight average molecular weight higher than 1,000,000, on the other hand, results in a water-based, substrate treatment composition the viscosity of which is so high that the substrate treatment composition is inferior in working efficiency and the concentration of the chitosan (A) in the substrate treatment composition has to be controlled low.

More preferably, the chitosan (A) is glycerylated chitosan. Glycerylated chitosan is a substance disclosed in JP 59-8701 A, and is obtained by reacting chitosan and glycidol (1,2-epoxypropanol-3) at an appropriate ratio. As an alternative, one available from the market under the name of "glycerylated chitosan" or as an alternative, "dihydroxypropyl chitosan" is also usable in the present invention.

The metal compound (B), which is contained in the water-based, substrate treatment composition according to the present invention and which contains at least one metal selected from Zr, Ti, Hf, Mo, W, Se, Ce, Fe, Cu, Zn, V and trivalent Cr, is used in the form of a metal oxide, hydroxide, complex compound, organic acid salt, inorganic acid salt or the like. Illustrative are fluorozirconic acid, zirconium ammonium fluoride, zirconium acetate, zirconium nitrate, zirconium sulfate, zirconium ammonium carbonate, fluorotitanic acid, titanium ammonium fluoride, titanyl sulfate, titanium lactate, diisopropoxytitanium bis (acetylacetone), metavanadic acid, ammonium metavanadate, sodium metavanadate, vanadium pentoxide, vanadyl sulfate, vanadyl acetylacetate, vanadium acetylacetate, cerium acetylacetate, cerium nitrate, cerium sulfate, cerium fluoride, selenium dioxide, selenium sulfide, sodium selenate, nickel selenate, ammonium molybdate, sodium molybdate, 12-molybdophosphoricacid, ammonium molybdophosphate, sodium molybdophosphate, ammonium tungsten, sodium tungstate, tungsten hexacarbonyl, 12-tungstophosphoric acid, ammonium tungstophosphate, sodium tungstophosphate, silicotungstic acid, iron acetylacetonate, iron citrate, ammonium ferric citrate, iron oxalate, ammonium ferric oxalate, ammonium iron(II) sulfate, ammonium iron(III) sulfate, iron fluoride, iron(II) lactate, iron(III) nitrate, zinc acetate, Zincacetylacetate, zinc carbonate, zinc citrate, zinc fluoride, zinc fluorosilicate, zinc lactate, zinc nitrate, chromium sulfate, chromium nitrate, chromium fluoride, chromium oxalate, and chromium acetate.

Owing to metal-based crosslinking by the formation of a metal complex between the metal compound (B) and the chitosan (A) and, depending on the kind of the metal compound, its own anti-corrosive effect for the metal material, excellent corrosion resistance is exhibited by the treated metal material. In particular, metal compounds containing trivalent Cr, Ti, Zr, V, Mo or Ce can be used preferably in the present invention as they have very strong anti-corrosive effect by themselves.

As described above, the metal compound (B) is intended to make the metal material exhibit corrosion resistance, and unlike inorganic pigments such as zinc oxide (zinc white), titanium oxide and chromium oxide (Chrome Green) or phthalocyanine organic pigments containing copper, iron or zinc as central metals, is not intended to effect coloration.

Preferably, the water-based, substrate treatment composition according to the present invention may further contain (C) an organic compound containing one or more carboxyl groups. This carboxyl compound can improve the stability of the water-based, substrate treatment composition according to the present invention, and further, can promote the crosslinkability (insolubility) of an undercoat to be formed on the surface of a metal material. Examples of the organic compound (C) include, but are not limited to, acetic acid, oxalic acid, malonic acid, malic acid, tartaric acid, mellitic acid, adipic acid, succinic acid, maleic acid, phthalic acid, sebacic acid, citric acid, butanetricarboxylic acid, propanetricarboxylic acid, trimellitic acid, ethylenediaminetetracarboxylic acid, 1,2,3,4-butanetetracarboxylic acid, diethylenetriamine pentaacetate, tannic acid, phytic acid, polyacrylic acid, and polymethacrylic acid. Among these, use of a tribasic acid, tetrabasic acid or pentabasic acids is more preferred from the standpoint of crosslinkability.

To the water-based, substrate treatment composition according to the present invention, an organic acid, inorganic acid, complex fluoride, alkali metal salt, ammonia or a salt thereof can be added to adjust the pH. Examples of such an additive include, but are not limited to, acetic acid, citric acid, lactic acid, malic acid, succinic acid, tartaric acid, adipic acid, 1,2,3,4-butanetetracarboxylic acid, sulfuric acid, nitric acid, silicic acid, hydrosilicofluoric acid, hydrofluoric acid, phosphoric acid, fluorozirconic acid, fluorotitanic acid, sodium hydroxide, ammonia, ammonium bicarbonate, sodium carbonate, and sodium bicarbonate.

Further, a solvent in the water-based, substrate treatment composition according to the present invention is primarily composed of water. To lower the surface tension of the treatment composition with a view to improving its leveling property upon coating and/or to permit drying at low temperatures, however, a water-soluble, low-boiling-point, organic solvent such as an alcohol or ketone may also be used in combination as needed to adjust one or more physical properties of the substrate treatment composition.

From the standpoint of working efficiency and composition stability upon coating, it is preferred that in the water-based, substrate treatment composition according to the present invention, the concentration of the chitosan (A) is in a range of from 0.001 wt. % to 10 wt. % while the concentration of the metal compound (B), which contains at least one metal selected from Ti, Zr, Hf, Mo, W, Se, Ce, Fe, Cu, Zn, V and trivalent Cr, is in a range of from 0.001 wt. % to 10 wt. %. Concerning the ratio of the chitosan to the metal compound in the water-based substrate treatment composition, on the other hand, the metal compound may preferably be contained in a range of from about 1 to 1,000 parts by weight per 100 parts by weight of the chitosan.

More preferably, upon treating a material with the substrate treatment composition of the present invention by the above-described "chemical conversion treatment", the concentrations of both components may each be set in a range of from 0.001 wt. % to 1 wt. % and the temperature of the water-based, substrate treatment composition may be set in a range of from 40° C. to 70° C. When conducting substrate treatment by the above-described "coating treatment", on the other hand, it can be preferred to set the concentration of each of the components in a range of from 1 wt. % to 10 wt.

% and the temperature of the water-based, substrate treatment composition in a range of from 10° C. to 40° C.

A description will next be made about the substrate treatment method according to the present invention. In the substrate treatment method according to the present invention, the water-based, substrate treatment composition is allowed to remain adhered on the surface of the material, for example, a metal material under treatment until heating and drying steps after the water-based, substrate treatment composition has been coated on the surface of the metal material. Preferably immediately, the thus-coated metal material is heated and dried ("coating treatment"). As an alternative, after the components in the water-based, substrate treatment composition are allowed to undergo chemical reactions with the surface of the metal material (to deposit), the surface can be rinsed with water, and, preferably immediately, the metal material can be heated and dried ("chemical conversion treatment"). The heating and drying may be conducted preferably in a temperature range of from 80° C. to 300° C., more preferably in a temperature range of from 100° C. to 250° C. A heat supply source for the heating and drying can be electricity, gas, infrared rays or the like, although no particular limitation is imposed thereon.

No particular limitation is imposed on the method for coating the water-based, substrate treatment composition according to the present invention on the material to be treated, for example, a metal material, but as examples, roll coating, spin coating, dipping, spray coating and the like can be mentioned. Further, the temperature of the water-based, substrate treatment composition at the time of its use may preferably be in a range of from 5° C. to 80° C., although no particular limitation is imposed thereon.

Concerning the coat weight of the undercoat formed on the surface of the metal material or the like, the dry coat weight of the chitosan (A) may preferably be in a range of from 1 to 500 mg/m$^2$ calculated as chitosan. A coat weight smaller than 1 mg/m$^2$ cannot provide a resin coating layer, which is to be formed on the undercoat, with sufficient adhesive properties or solvent resistance, while a coat weight greater than 500 mg/m$^2$ requires high cost for the formation of the undercoat and is not preferred economically. On the other hand, the dry coat weight of the metal compound, which contains at least one metal selected from Zr, Ti, Hf, Mo, W, Se, Ce, Fe, Cu, Zn, V and trivalent Cr, may preferably be in a range of from 1 to 500 mg/m$^2$ calculated as the metal. A coat weight of the metal compound smaller than 1 mg/m$^2$ cannot provide the metal material with sufficient corrosion resistance, while its coat weight greater than 500 mg/m$^2$ results in higher cost and is not preferred economically.

The water-based, substrate treatment composition according to the present invention is useful for the substrate treatment of many metal materials and other materials. As particularly suitable materials, aluminum, magnesium, copper, iron, zinc, nickel or alloys thereof can be mentioned. No particular limitation is imposed on the shape of the metal material, but illustrative are sheet-like or plate-like materials such as sheet materials, coiled materials and foil materials, and molded products and cast products such as casings and machine parts and components.

No particular limitation is imposed on the target material to be subjected to substrate treatment (the material to be treated) with the water-based, substrate treatment composition according to the present invention, so that in addition to the above-described metal materials, the water-based, substrate treatment composition according to the present invention can also be applied to any of plastics, fibers, fabrics, ceramics, chinas, porcelains and glass. However, metal materials are particularly preferred because the advantageous effects of the water-based, substrate treatment composition according to the present invention can be pronouncedly exhibited.

Prior to coating the water-based, substrate treatment composition according to the present invention onto the surface of the metal material, it is necessary to clean the surface of the metal material. Described specifically, rust preventive oil, rolling oil or the like is often stuck on the surfaces of metal materials employed in industry, so that their removal is needed. No particular limitation is imposed on the removing method, but solvent degreasing, alkaline degreasing, acid degreasing or the like can be mentioned. Subsequent to degreasing, water rinsing is needed to remove any degreasing agent still remaining on the surface of the metal such that the degreasing agent is replaced with water.

After and in continuation with the water rinsing, the water-based, substrate treatment composition according to the present invention may be coated while water is still remaining adhered. As an alternative, the water-based, substrate treatment composition may be coated after drying the surface of the metal material. The drying can be conducted in a temperature range of from 30° C. to 150° C., and no particular limitation is imposed on the drying method.

Onto the metal material with a dry undercoat formed thereon by using the water-based, substrate treatment composition according to the present invention, a film can be laminated as a resin coating layer. A film is equipped with adhesive properties, gas barrier property, electrical conductivity and/or external attractiveness, and a wide variety of films are usable depending on the application purposes. Therefore, no particular limitation is imposed on the film. Examples of the film include films made of polyester resins, polyethylene resin, polypropylene resin, polycarbonate resins, polyvinyl alcohol resin, polyvinyl acetal resin, polyamide resins, polyvinyl acetate resins, epoxy resins, polyimide resins or the like. Also usable are films with conductive fillers, colorants or the like added therein to provide them with function properties.

Onto the metal material with a dry undercoat formed thereon by using the water-based, substrate treatment composition according to the present invention, a coating formulation can be applied as a resin coating layer. Similar to the film described above, the resulting coating is equipped with excellent adhesive properties to the metal material, gas barrier property, conductivity and/or external attractiveness, and a wide variety of coating formulations are usable depending on the application purposes of the metal material. Therefore, no particular limitation is imposed on the coating formulation. Examples of the type of the coating formulation include those prepared by either dissolving or dispersing in water or organic solvents polyacrylic resin, epoxy resins, silicone resin, polyester resins, vinylidene fluoride resin, polyurethane resin, polycarbonate resins, polyamide resins or the like. Also usable are coating formulations with conductive fillers, colorants or the like added therein to provide them with function properties.

In the present invention as described in the above, chitosan for use in the present invention is inherently insoluble in water and contains amino groups and hydroxyl groups in its skeleton. When an acid is added to convert chitosan into a salt, the amino groups show cationic property so that chitosan is rendered soluble in water. Glycerylated chitosan can be rendered soluble in water with a smaller amount of an acid component because it contains many hydroxyl groups in its skeleton.

Upon formation of an undercoat with the substrate treatment composition according to the present invention, the amino groups and/or hydroxyl groups of the chitosan coordinate to the side of the material, specifically the metal material so that excellent adhesion with the surface of the metal material is developed. Further, many of such polar groups as described above also coordinate on the side of the surface of the undercoat even after the formation of the undercoat. When a resin coating layer such as a film or coating is formed over the undercoat, superb adhesion is developed between them. Although the chitosan itself is fundamentally excellent in solvent resistance (waterproofness), the metal compound employed in the present invention makes it possible to form an insolubilized undercoat of still higher toughness by undergoing a metal-dependent crosslinking reaction with amino groups contained in the skeleton of the chitosan.

For the reasons mentioned above, the undercoat composed of the chitosan and the metal compound is effective in keeping the metal surface and a resin coating layer firmly adhered with each other when the resin coating layer is applied to the metal surface or even when subsequently subjected to extensive forming. Owing to the formation of a dense undercoat through a metal-dependent crosslinking reaction in addition to the anticorrosive effect of the metal compound itself, the resin coating layer on the resulting metal material is excellent in durable adhesive properties and solvent resistance even after forming.

The water-based, substrate treatment composition according to the present invention can be suitably applied to the above-described metal material. Specific examples of the applications to the metal materials include, but are not limited to, the formation of undercoats or film laminates on can tops of beverage containers, hydrophilic undercoats on fins for heat exchangers, and general undercoats on construction materials and the like.

Further, the substrate treatment composition according to the present invention is also effective as a finish for fibers, and can provide various fibers, woven fabrics, nonwoven fabrics and the like excellent in washfastness and antimicrobial properties. Therefore, each "substrate treatment composition" according to the present invention will be called "a fiber finish" when it is used for the treatment of fibers.

EXAMPLES

Concerning the water-based, substrate treatment composition according to the present invention, some examples will hereinafter be described, and their usefulness will be shown in comparison with those of comparative examples. In the following description, all the designations of "part" or "parts" and "%" are on a weight basis unless otherwise specifically indicated.

Example A (Treatment of Metal Material)

Examples 1-13 and Comparative Examples 1-6

The below-described water-based, substrate treatment compositions (hereinafter called "water-based primers") were applied to plates of the below-described metal material by the below-described methods (hereinafter called "priming methods"), respectively, and as will be described subsequently herein, the metal plates were provided on surfaces thereof with resin coating layers and were then subjected to forming. The metal plates so obtained were ranked for various properties by the ranking methods to be described subsequently herein.

1. Metal Material

Aluminum alloy plates (JIS A3004; plate thickness: 0.26 mm) were provided as sample materials. A 2% aqueous solution of a commercial alkaline degreasing agent (trademark: "FINE CLEANER 4377K", product of NIHON PARKERIZING CO., LTD.) was sprayed at 50° C. for 10 seconds against the plates to degrease them. The thus-degreased plates were then rinsed with water to clean their surfaces.

2. Water-based Primers

The water-based primers employed as examples and comparative examples were prepared as will be described hereinafter. Upon preparation of the water-based primers, deionized water and a pH adjuster were used.

<Water-based Primer 1>

Chitosan (Mw: 100,000, 10 parts) was dispersed in deionized water (500 parts). After 1,2,3,4-butanetetracarboxylic acid (7.5 parts) was added, the resulting mixture was stirred at room temperature for 4 hours to dissolve the components. Fluorozirconic acid (5 parts) was then added, and with aqueous ammonia, the thus-obtained mixture was adjusted to pH 3.0 to afford a water-based primer (1,000 parts).

<Water-based Primer 2>

Carboxymethylchitosan (Mw: 100,000, 10 parts) was dispersed in deionized water (500 parts). After citric acid (15 parts) was added, the resulting mixture was stirred at room temperature for 4 hours to dissolve the components. Fluorozirconic acid (5 parts) was then added, and with aqueous ammonia, the thus-obtained mixture was adjusted to pH 3.0 to afford a water-based primer (1,000 parts).

<Water-based Primer 3>

Cationized chitosan (Mw: 100,000, degree of substitution by a quaternary ammonium base: 1.1, 10 parts), which had been obtained by reacting 2,3-epoxypropyltrimethylammonium chloride with chitosan, was dispersed in deionized water (500 parts). After 1,2,3,4-butanetetracarboxylic acid (15 parts) was added, the resulting mixture was stirred at room temperature for 4 hours to dissolve the components. Fluorozirconic acid (5 parts) was then added, and with aqueous ammonia, the thus-obtained mixture was adjusted to pH 3.0 to afford a water-based primer (1,000 parts).

<Water-based Primer 4>

Glycerylated chitosan (Mw: 100,000, degree of glycerylation: 1.1, 10 parts) was dispersed in deionized water (500 parts). After 1,2,3,4-butanetetracarboxylic acid (15 parts) was added, the resulting mixture was stirred at room temperature for 4 hours to dissolve the components. Fluorozirconic acid (5 parts) was then added, and with aqueous ammonia, the thus-obtained mixture was adjusted to pH 3.0 to afford a water-based primer (1,000 parts).

<Water-based Primer 5>

Glycerylated chitosan (Mw: 100,000, degree of glycerylation: 2.0, 10 parts) was dispersed in deionized water (500 parts). After succinic acid (2.5 parts) was added, the resulting mixture was stirred at room temperature for 4 hours to dissolve the components. Zirconium ammonium carbonate (7 parts) was then added, and with aqueous ammonia, the thus-obtained mixture was adjusted to pH 8.0 to afford a water-based primer (1,000 parts).

<Water-based Primer 6>

Glycerylated chitosan (Mw: 100,000, degree of glycerylation: 3.0, 10 parts) was dispersed in deionized water (500 parts). After 1,2,3,4-butanetetracarboxylic acid (2.5 parts) was added, the resulting mixture was stirred at room temperature for 4 hours to dissolve the components. Ammonium molybdate (5 parts) was then added, and with aqueous ammonia, the thus-obtained mixture was adjusted to pH 8.0 to afford a water-based primer (1,000 parts).

<Water-based Primer 7>

Glycerylated chitosan (Mw: 100,000, degree of glycerylation: 1.1, 10 parts) was dispersed in deionized water (500 parts). After ethylenediaminetetraacetic acid (10 parts) was added, the resulting mixture was stirred at room temperature for 4 hours to dissolve the components. Cerium nitrate (8 parts) was then added, and with aqueous ammonia, the thus-obtained mixture was adjusted to pH 3.0 to afford a water-based primer (1,000 parts).

<Water-based Primer 8>

Glycerylated chitosan (Mw: 100,000, degree of glycerylation: 1.1, 10 parts) was dispersed in deionized water (500 parts). After 1,2,3,4-butanetetracarboxylic acid (10 parts) was added, the resulting mixture was stirred at room temperature for 4 hours to dissolve the components. Chromium fluoride (4.5 parts) was then added to afford a water-based primer (1,000 parts) without any pH adjustment.

<Water-based Primer 9>

Glycerylated chitosan (Mw: 100,000, degree of glycerylation: 1.1, 0.02 part) was dispersed in deionized water (500 parts). After 1,2,3,4-butanetetracarboxylic acid (0.02 part) was added, the resulting mixture was stirred at room temperature for 4 hours to dissolve the components. Fluorozirconic acid (0.5 part) was then added, and with aqueous ammonia, the thus-obtained mixture was adjusted to pH 3.0 to afford a water-based primer (1,000 parts).

<Water-based Primer 10>

Chitosan (Mw: 100,000, 0.5 part) was dispersed in deionized water (500 parts). After 1,2,3,4-butanetetracarboxylic acid (0.5 part) was added, the resulting mixture was stirred at room temperature for 4 hours to dissolve the components. Fluorozirconic acid (1 part) was then added, and with aqueous ammonia, the thus-obtained mixture was adjusted to pH 3.0 to afford a water-based primer (1,000 parts).

<Water-based Primer 11>

Glycerylated chitosan (Mw: 100,000, degree of glycerylation: 1.1, 0.5 part) was dispersed in deionized water (500 parts). After 1,2,3,4-butanetetracarboxylic acid (0.5 part) was added, the resulting mixture was stirred at room temperature for 4 hours to dissolve the components. Fluorozirconic acid (1 part) was then added, and with aqueous ammonia, the thus-obtained mixture was adjusted to pH 3.0 to afford a water-based primer (1,000 parts).

<Water-based Primer 12, Comparative Example>

Glycerylated chitosan (Mw: 100,000, degree of glycerylation: 1.1, 10 parts) was dispersed in deionized water (500 parts). After 1,2,3,4-butanetetracarboxylic acid (15 parts) was added, the resulting mixture was stirred at room temperature for 4 hours to dissolve the components. Deionized water was then added to afford a water-based primer (1,000 parts).

<Water-based Primer 13, Comparative Example (see JP 10-46101 A)>

Orthophosphric acid (4 parts) was added to deionized water (500 parts), followed by the addition of a phenolic resin (10 parts). The resulting mixture was stirred at room temperature for 1 hour to dissolve the components. γ-Glycosidopropyltrimethoxysilane (0.05 part) was then added, and with aqueous ammonia, the thus-obtained mixture was adjusted to pH 5.0 to afford a water-based primer (1,000 parts).

<Water-based Primer 14, Comparative Example>

Polyacrylic acid (Mw: 100,000, 16 parts) was added to deionized water, followed by the addition of chromium fluoride (4.5 parts). The resulting mixture was stirred at room temperature for 4 hours to dissolve the components, so that a water-based primer (1,000 parts) was afforded without any pH adjustment.

<Water-based Primer 15, Comparative Example>

A water-based, phosphoric acid chromate primer ("ALCHROM K702", trademark; product of NIHON PARKERIZING CO., LTD.) was used.

<Water-based Primer 16, Comparative Example>

A water-based, zirconium phosphate primer ("PALCOAT N405", trademark; product of NIHON PARKERIZING CO., LTD.) was used.

<Water-based Primer 17, Comparative Example (See JP 10-1789 A)>

To deionized water (500 parts), phosphoric acid (0.5 part), fluoric acid (0.5 part), a phenolic resin (1 part) and ammonium molybdate (0.02 part) were added to afford a water-based primer of pH 3.5 (1,000 parts).

3. Priming Methods

Priming Method A (Coating Treatment)

Priming with many of the water-based primers described in Table 1 was conducted by coating the metal plates, which had been dried subsequent to degreasing and water rinsing, with the above-described many water-based primers, respectively, by a roll coater to give a wet coat weight of 2 g/m$^2$ and then baking and drying the water-based primers under the corresponding priming conditions described in Table 2. As a result, primed metal plates were prepared with the corresponding predetermined coat weights.

Priming Method B (Chemical Conversion Treatment)

Priming with the remaining water-based primers described in Table 1 was conducted by spray-coating the metal plates, which were still wet subsequent to degreasing and water rinsing, with the remaining water-based primers, respectively, at a pressure of 1.0 kg/cm$^2$ under the corresponding priming conditions described in Table 2, conducting rinsing with tap water for 5 seconds and with purified water for 5 seconds, and heating and drying the thus-rinsed metal plates at 80° C. for 1 minute.

4. Forming Methods Of Resin Coating Layers 4.1 Film lamination

On metal plates primed as described above, polyester films (film thickness: 16 μm) were laminated, respectively, under heat at 250° C. for 5 seconds (at 180° C. as the temperature reached by the sheet) while controlling the roll pressure at 50 kg/cm$^2$.

4.2 Coating

Using as a coating formulation a commercially-available, water-based acrylic epoxy emulsion having a solid concentration of 40%, metal plates primed as described above were coated by roll coating to give a wet coat weight of 25 g/m$^2$. The conditions for the heating and drying after the coating were set at 25° C.×1 minute (250° C. calculated as ultimate plate temperature), and the dry coat weight was set at 10 g/m$^2$.

5. Forming

With respect to each of the metal plates provided with the resin coating layers as described above, a drawing and ironing test was conducted. The coated metal plate punched with a diameter of 160 mm was subjected to deep drawing (1) to form a cup of 100 mm in diameter. The cup was then subjected again to deep drawing (2) to reduce the diameter to 75 mm. The cup was subjected to further deep drawing (3) to reduce the diameter to 65 mm so that a can was produced as a sample material. The percentage reductions in the respective forming steps (1), (2) and (3) were set at (1) 5%, (2) 15% and (3) 15%, respectively.

6. Ranking of Performance 6.1 Initial Adhesion

After performing the forming, the initial adhesion of each resin coating layer was ranked in accordance with the following ranking standards.

A: Production of a can is feasible without any separation of the resin coating layer.
B: Production of a can is feasible with localized separation of the resin coating layer.
C: Production of a can is not feasible due to tearing of the resin coating layer.

6.2 Durable Adhesive Properties

With respect to each sample material which had been subjected to the forming, a retort test was performed in an atmosphere of heated and pressurized steam. Conditions were set at 125° C.×1 hour, and a commercially-available sterilizer was used.

A: Absolutely no separation of the resin coating layer.
B: Localized separation of the resin coating layer.
C: Separation of the resin coating layer over the entire area thereof.

6.3 Corrosion Resistance

Each can which had been produced by draw-shear spinning was filled with model juice (citric acid monohydrate:sodium chloride:deionized water=5:5:990 (weight ratio)), and was allowed to stand at 60° C. up to the $120^{th}$ hour. The external appearance of the inner wall of the can was visually inspected.

A: No change in external appearance.
B: Localized occurrence of separation (lifting) of the resin coating layer and corrosion under the resin coating layer.
C: Occurrence of separation (lifting) of the resin coating layer and corrosion under the resin coating layer over the entire area thereof.

6.4 Solvent Resistance

Each sample material which had been subjected to the forming was immersed in a 20% aqueous solution of ethanol at 60° C. for 120 hours, and its external appearance was observed.

A: No change in external appearance.
B: Localized separation or blister of the resin coating layer.
C: Separation or blister of the resin coating layer.

The compositions of the water-based primers used in Examples 1-13 and Comparative Examples 1-6 are presented in Table 1. The priming methods, the priming conditions and the dry coat weights of the chitosan and metal in the undercoats formed on the surfaces of the metal materials are shown in Table 2. The results obtained by conducting the above-described tests and ranking are summarized in Table 3.

TABLE 1

Water-based Primers

| EXAMPLE A/ Comp. Ex. | Water-based primer | Component used as a chitosan (A) | Metal component used in a metal compound (B) | Component used as an organic compound (C) |
|---|---|---|---|---|
| Example 1 | 1 | Chitosan | Zr | BTC |
| Example 2 | 2 | Carboxymethyl-chitosan | Zr | Citric acid |
| Example 3 | 3 | Cationized chitosan | Zr | BTC |
| Example 4 | 4 | Glycerylated chitosan | Zr | BTC |
| Example 5 | 5 | Glycerylated chitosan | Zr | Succinic acid |
| Example 6 | 6 | Glycerylated chitosan | Mo | BTC |
| Example 7 | 7 | Glycerylated chitosan | Ce | Ethylene-diamine-tetra acetic acid |
| Example 8 | 8 | Glycerylated chitosan | Cr (trivalent) | BTC |
| Example 9 | 9 | Glycerylated chitosan | Zr | BTC |
| Example 10 | 4 | Glycerylated chitosan | Zr | BTC |
| Example 11 | 4 | Glycerylated chitosan | Zr | BTC |
| Example 12 | 10 | Chitosan | Zr | BTC |
| Example 13 | 11 | Glycerylated chitosan | Zr | BTC |

TABLE 1-continued

Water-based Primers

| EXAMPLE A/ Comp. Ex. | Water-based primer | Component used as a chitosan (A) | Metal component used in a metal compound (B) | Component used as an organic compound (C) |
|---|---|---|---|---|
| Comp. Ex. 1 | 12 | Glycerylated chitosan | — | BTC |
| Comp. Ex. 2 | 13 | Phenolic resin | — | — |
| Comp. Ex. 3 | 14 | Acrylic resin | Cr (trivalent) | — |
| Comp. Ex. 4 | 15 | — | Cr (hexavalent) | — |
| Comp. Ex. 5 | 16 | — | Zr | — |
| Comp. Ex. 6 | 17 | Phenolic resin | Mo | — |

* 1,2,3,4-Butanetetracarboxylic acid is written as "BTC" for short.

TABLE 2

Priming Conditions and Primed Undercoats

| Example A/ Comp. Ex. | Priming method | Heating and drying temperature [° C.] | Priming time [sec] | Primed undercoat Coat weight of the chitosan (A) [mg/m$^2$] | Primed undercoat Coat weight of the metal compound (B) [mg/m$^2$] |
|---|---|---|---|---|---|
| Example 1 | A | 200 | 30 | 50 | 10 |
| Example 2 | A | 200 | 30 | 50 | 10 |
| Example 3 | A | 200 | 30 | 50 | 10 |
| Example 4 | A | 200 | 30 | 50 | 10 |
| Example 5 | A | 200 | 30 | 50 | 10 |
| Example 6 | A | 200 | 30 | 50 | 10 |
| Example 7 | A | 200 | 30 | 50 | 10 |
| Example 8 | A | 200 | 30 | 50 | 10 |
| Example 9 | A | 200 | 30 | 1 | 1 |
| Example 10 | A | 80 | 30 | 50 | 10 |
| Example 11 | A | 300 | 30 | 50 | 10 |
| Example 12 | B | 80 | 30 | 20 | 10 |
| Example 13 | B | 80 | 30 | 20 | 10 |
| Comp. Ex. 1 | A | 200 | 30 | 50 | — |
| Comp. Ex. 2 | A | 200 | 30 | 50 | — |
| Comp. Ex. 3 | A | 200 | 30 | 50 | 10 |
| Comp. Ex. 4 | B | 80 | 10 | — | 10 |
| Comp. Ex. 5 | B | 80 | 10 | — | 10 |
| Comp. Ex. 6 | B | 80 | 20 | 20 | 10 |

* The coat weight of each metal compound (B) is written calculated as the metal.

TABLE 3

Ranking Results

| Example A/ Comp. Ex. | Initial adhesion | Durable adhesive properties | Corrosion resistance | Solvent resistance | Hexavalent chromium |
|---|---|---|---|---|---|
| Example 1 | A/A | A/A | A/A | A/A | Not used |
| Example 2 | A/A | A/A | A/A | A/A | Not used |
| Example 3 | A/A | A/A | A/A | A/A | Not used |
| Example 4 | A/A | A/A | A/A | A/A | Not used |
| Example 5 | A/A | A/A | A/A | A/A | Not used |
| Example 6 | A/A | A/A | A/A | A/A | Not used |
| Example 7 | A/A | A/A | A/A | A/A | Not used |
| Example 8 | A/A | A/A | A/A | A/A | Not used |
| Example 9 | A/A | A/A | A/A | A/A | Not used |
| Example 10 | A/A | A/A | A/A | A/A | Not used |
| Example 11 | A/A | A/A | A/A | A/A | Not used |
| Example 12 | A/A | A/A | A/A | A/A | Not used |
| Example 13 | A/A | A/A | A/A | A/A | Not used |
| Comp. Ex. 1 | A/A | A/B | B/C | A/B | Not used |
| Comp. Ex. 2 | A/B | A/B | B/C | B/B | Not used |
| Comp. Ex. 3 | A/A | A/A | B/C | B/B | Not used |
| Comp. Ex. 4 | A/A | A/B | A/B | A/A | Used |
| Comp. Ex. 5 | A/B | B/C | B/C | B/C | Not used |
| Comp. Ex. 6 | A/B | B/B | B/B | B/B | Not used |

* The ranking results are written in the order of "lamination/coating".

As is evident from the results of Table 3, Examples 1-13 were excellent in all of the initial adhesion of resin coating layer, durable adhesive properties, solvent resistance and the corrosion resistance of metal material. As is also appreciated from the compositions of the water-based primers, those primers did not contain hexavalent chromium at all.

In Comparative Example 1 making use of a water-based primer which did not contain any metal compound as an essential component for the water-based, substrate treatment composition according to the present invention and contained only glycerylated chitosan, Comparative Example 2 making use of a water-based primer which contained a phenolic resin, orthophosphoric acid and an organosilicon compound, and Comparative Example 3 making use of a water-based primer which contained polyacrylic acid and trivalent chromium, one or more of initial adhesion, solvent resistance and the corrosion resistance of metal material were not satisfactory. Comparative Example 4, in which chemical conversion treatment was conducted with a water-based phosphoric acid chromate primer, was not satisfactory in durable adhesive properties and the corrosion resistance of metal material, and moreover, is not preferred environmentally because of the inclusion of hexavalent chromium in the water-based primer. Comparative Example 5, in which chemical conversion treatment was conducted with a water-based, zirconium phosphate primer, and Comparative Example 6, in which chemical conversion treatment was conducted with a phenol resin and molybdenic acid, were unable to satisfy the initial adhesion of resin coating layer, durable adhesive properties, solvent resistance and the corrosion resistance of metal material.

Example B (Treatment of Fibrous Material)

Water-based fiber finishes employed as examples and comparative examples are shown in Table 4. Details of the water-based fiber finishes employed as the examples are summarized in Table 4, and those water-based fiber finishes were prepared as will be described hereinafter.

Example 1

Chitosan (Mw: 100,000, 1 part) was dispersed in distilled water (50 parts). After citric acid (0.5 part) was added, the resulting mixture was stirred at room temperature for 4 hours into a solution. Fluorozirconic acid (0.3 part) was then added, and with aqueous ammonia, the thus-obtained mixture was adjusted to pH 3.0 to afford a water-based fiber finish (100 parts).

Example 2

Cationized chitosan (degree of cationization: 1.1, Mw: 110,000, 1 part) was dispersed in distilled water (50 parts). After 1,2,3,4-butanetetracarboxylic acid (BTC) (0.5 part) was added, the resulting mixture was stirred at room temperature for 2 hours into a solution. Fluorozirconic acid (0.3 part) was then added, and with aqueous ammonia, the thus-obtained mixture was adjusted to pH 3.0 to afford a water-based fiber finish (100 parts).

Example 3

Glycerylated chitosan (degree of glycerylation: 0.6, Mw: 100,000, 1 part) was dispersed in distilled water (50 parts). After BTC (0.5 part) was added, the resulting mixture was stirred at room temperature for 2 hours into a solution. Fluorozirconic acid (0.3 part) was then added, and with aqueous ammonia, the thus-obtained mixture was adjusted to pH 3.0 to afford a water-based fiber finish (100 parts).

Example 4

Cationized chitosan (degree of cationization: 1.1, Mw: 110,000, 1 part) was dispersed in distilled water (97.5 parts). After succinic acid (1 part) was added, the resulting mixture was stirred at room temperature for 2 hours into a solution. Zirconium acetate (0.5 part) was then added to afford a water-based fiber finish (100 parts).

Example 5

Cationized chitosan (degree of cationization: 1.1, Mw: 110,000, 1 part) was dispersed in distilled water (50 parts). After citric acid (0.5 part) was added, the resulting mixture was stirred at room temperature for 2 hours into a solution. Ammonium molybdate (0.5 part) was then added, and with aqueous ammonia, the thus-obtained mixture was adjusted to pH 8.0 to afford a water-based fiber finish (100 parts).

Example 6

Cationized chitosan (degree of cationization: 0.5, Mw: 80,000, 1 part) was dispersed in distilled water (98.2 parts). After BTC (0.5 part) was added, the resulting mixture was stirred at room temperature for 2 hours into a solution. Chromium fluoride (0.3 part) was then added to afford a water-based fiber finish (100 parts).

Example 7

Cationized chitosan (degree of cationization: 1.1, Mw: 110,000, 1 part) was dispersed in distilled water (50 parts). After lactic acid (0.5 part) was added, the resulting mixture was stirred at room temperature for 2 hours into a solution. Cerium nitrate (0.5 part) was then added, and with aqueous ammonia, the thus-obtained mixture was adjusted to pH 3.0 to afford a water-based fiber finish (100 parts).

Example 8

Cationized chitosan (degree of cationization: 1.1, Mw: 110,000, 1 part) was dispersed in distilled water (50 parts). After BTC (0.5 part) was added, the resulting mixture was stirred at room temperature for 2 hours into a solution. Zirconium ammonium carbonate (0.5 part) was then added, and with aqueous ammonia, the thus-obtained mixture was adjusted to pH 8.0 to afford a water-based fiber finish (100 parts)

Example 9

Cationized chitosan (degree of cationization: 1.1, Mw: 110,000, 3 parts) was dispersed in distilled water (50 parts). After BTC (1 part) was added, the resulting mixture was stirred at room temperature for 2 hours into a solution. Fluorozirconic acid (1 part) was then added, and with aqueous ammonia, the thus-obtained mixture was adjusted to pH 3.0 to afford a water-based fiber finish (100 parts).

Example 10

Cationized chitosan (degree of cationization: 1.1, Mw: 300,000, 0.5 part) was dispersed in distilled water (50 parts). After BTC (0.2 part) was added, the resulting mixture was stirred at room temperature for 2 hours into a solution. Fluorozirconic acid (0.2 part) was then added, and with aqueous ammonia, the thus-obtained mixture was adjusted to pH 3.0 to afford a water-based fiber finish (100 parts).

Example 11

Cationized chitosan (degree of cationization: 1.3, Mw: 1,000,000, 0.1 part) was dispersed in distilled water (50 parts). After BTC (0.1 part) was added, the resulting mixture was stirred at room temperature for 2 hours into a solution. Fluorozirconic acid (0.1 part) was then added, and with aqueous ammonia, the thus-obtained mixture was adjusted to pH 3.0 to afford a water-based fiber finish (100 parts).

Examples 12-14

Fiber finishes of Examples 12-14 were prepared in a similar manner as in Example 2.

Comparative Examples

Details of water-based fiber finishes employed as the comparative examples are shown in Table 4, and those water-based fiber finishes were prepared as will be described hereinafter.

Comparative Example 1

Chitosan (Mw: 100,000, 1 part) was dispersed in distilled water (90 parts). After lactic acid (1 part) was added, the resulting mixture was stirred at room temperature for 4 hours into a solution. Distilled water was added to adjust the whole amount to 100 parts so that a water-based fiber finish was afforded.

Comparative Example 2

Cationized chitosan (degree of cationization: 1.1, Mw: 110,000, 1 part) was dispersed in distilled water (90 parts). After lactic acid (1 part) was added, the resulting mixture was stirred at room temperature for 4 hours into a solution. Distilled water was added to adjust the whole amount to 100 parts so that a water-based fiber finish was afforded.

Comparative Example 3

Comparative Example 3 is directed to a water-based fiber finish making use of polyethylene glycol diglycidyl ether as a crosslinking component. Cationized chitosan (degree of cationization: 1.1, Mw: 80,000, 1 part) was dispersed in distilled water (80 parts). After lactic acid (0.5 part) was added, the resulting mixture was stirred at room temperature for 2 hours into a solution. Polyethylene glycol diglycidyl ether (1 part) and a 10% aqueous solution of sodium hydroxide (10 parts) were added. Distilled water was then added to adjust the whole amount to 100 parts.

Examples 15-28, Comparative Examples 4-6

Using the water-based fiber finishes of the respective examples and comparative examples, they were caused to deposit on fabrics in accordance with the below-described fabric finishing method and the finishing conditions of Table 5. The finished fabrics were each washed 10 cycles, 50 cycles or 100 cycles in a household washing machine in accordance with the durability test against washing (JIS L 0217 103 Method), and then tested for antimicrobial properties by the standardized testing method. The ranking results are presented in Table 6.

<Fabric finishing method>

Cotton fabrics (20 cm×20 cm) were immersed at 25° C. for 3 minutes in the corresponding water-based fiber finishes shown in Table 4, and were then squeezed at the corresponding expression ratio presented in Table 5. Subsequently, the cotton fabrics were subjected to predrying and heat treatment under the corresponding conditions presented in Table 5.

TABLE 4

Water-based Fiber Finishes

| Example B/ Comp. Ex. | Chitosan | | Metal compound | | Carboxyl-containing organic compound | | Water (aq. Ammonia) |
|---|---|---|---|---|---|---|---|
| | Kind | Part(s) | Kind | Part | Kind | Part | Parts |
| Example 1 | Chitosan | 1 | Fluorozirconic acid | 0.3 | Citric acid | 0.5 | 98.2 |
| Example 2 | Cationized chitosan | 1 | Fluorozirconic acid | 0.3 | BTC | 0.5 | 98.2 |
| Example 3 | Glycerylated chitosan | 1 | Fluorozirconic acid | 0.3 | BTC | 0.5 | 98.2 |
| Example 4 | Cationized chitosan | 1 | Zirconium acetate | 0.5 | Succinic acid | 1 | 97.5 |
| Example 5 | Cationized chitosan | 1 | Ammonium molybdate | 0.5 | Citric acid | 0.5 | 98 |
| Example 6 | Cationized chitosan | 1 | Chromium fluoride | 0.3 | BTC | 0.5 | 98.2 |
| Example 7 | Cationized chitosan | 1 | Cerium nitrate | 0.5 | Lactic acid | 0.5 | 98 |
| Example 8 | Cationized chitosan | 1 | Zirconium ammonium carbonate | 0.5 | BTC | 0.5 | 98 |
| Example 9 | Cationized chitosan | 3 | Fluorozirconic acid | 1 | BTC | 1 | 95 |
| Example 10 | Cationized chitosan | 0.5 | Fluorozirconic acid | 0.2 | BTC | 0.2 | 99.1 |
| Example 11 | Cationized chitosan | 0.1 | Fluorozirconic acid | 0.1 | BTC | 0.1 | 99.7 |
| Example 12 | Cationized chitosan | 1 | Fluorozirconic acid | 0.3 | BTC | 0.5 | 98.2 |
| Example 13 | Cationized chitosan | 1 | Fluorozirconic acid | 0.3 | BTC | 0.5 | 98.2 |
| Example 14 | Cationized chitosan | 1 | Fluorozirconic acid | 0.3 | BTC | 0.5 | 98.2 |
| Comp. Ex. 1 | Chitosan | 1 | — | — | Lactic acid | 1 | 98 |
| Comp. Ex. 2 | Cationized chitosan | 1 | — | — | Lactic acid | 1 | 98 |
| Comp. Ex. 3 | Cationized chitosan | 1 | Polyethylene glycol diglycidyl ether (1 part), NaOH (1 part) | | | | 97 |

TABLE 5

Finishing Conditions

| EXAMPLE A/ Comp. Ex. | Water-based fiber finish | expression ratio (%) | Predrying conditions Temp. (° C.) | Time (min) | Heat treatment conditions Temp. (° C.) | Time (min) |
|---|---|---|---|---|---|---|
| Examples 15–25 | Examples 1–11 | 100 | 130 | 2 | 180 | 3 |
| Example 26 | Example 12 | 70 | 130 | 2 | 120 | 5 |
| Example 27 | Example 13 | 85 | 130 | 2 | 150 | 3 |
| Example 28 | Example 14 | 100 | 130 | 2 | 200 | 1 |
| Comp. Ex. 4 & 5 | Comp. Ex. 1 & 2 | 100 | 130 | 2 | 180 | 3 |
| Comp. Ex. 6 | Comp. Ex. 3 | 100 | — | — | 30 | 24 hours |

<Antimicrobial Test>

A test was conducted by adopting the bacteriostasis evaluation method (stadardized testing method) established by SEK (Japan Textile Evaluation Technical Council) and using *Staphylococcus aureus* as a test microorganism.

The testing was as follows: A fixed amount of a nutrient broth suspension of the above-described test microorganism at its logarithmic growth phase was added drop-wise to each sterilized test fabric. Subsequent to incubation at 37° C. for 18 hours in a hermetically-closed container, viable cells were counted. The viable cell numbers counted were determined relative to the inoculum size's cell numbers. The antimicrobial properties were ranked in accordance with the following standards.

Test conditions: log B–log A>1.5
Bacteriostatic activities: log B–log C (passed≧2.2)
Where,
A: Number of viable cells collected immediately after the inoculation in an unfinished fabric (or a standard fabric).
B: Number of viable cells collected after incubation of the unfinished fabric (or the standard fabric) for 18 hours.
C: Numbers of viable cells collected after incubation of a finished antimicrobial fabric for 18 hours.

TABLE 6

Ranking of Antimicrobial Properties
(by the standardized testing method)

Ranking of antimicrobial properties

| EXAMPLE B/ Comp. Ex. | Washing cycles: 0 | Washing cycles: 10 | Washing cycles: 50 | Washing cycles: 100 |
|---|---|---|---|---|
| Example 15 | A | B | B | B |
| Example 16 | A | A | A | A |
| Example 17 | A | B | B | B |
| Example 18 | A | A | A | A |
| Example 19 | A | A | A | A |
| Example 20 | A | A | A | A |
| Example 21 | A | A | A | A |
| Example 22 | A | A | A | A |
| Example 23 | A | A | A | A |
| Example 24 | A | A | A | A |
| Example 25 | B | B | B | B |
| Example 26 | A | B | B | B |
| Example 27 | A | A | A | A |
| Example 28 | A | A | A | A |
| Comp. Ex. 4 | B | C | C | C |
| Comp. Ex. 5 | A | C | C | C |
| Comp. Ex. 6 | A | A | A | B |

A: Bacteriostatic activities ≧ 4.0
B: 4.0 > Bacteriostatic activities ≧ 2.2
C: 2.2 > Bacteriostatic activities As is evident from the results of Table 6, good antimicrobial results were obtained in the present invention even after the durability test against washing owing to the heat treatment finishing of cellulose fibers with a water-based fiber finish which was composed of a chitosan, a metal compound and a carboxyl-containing organic compound. Examples 15-17 were different in the kind of chitosan, and gave good ranking results as shown in Table 6. Examples 18-22 were different in the kind of metal compound, and all gave good ranking results. In Examples 23-25, tests were conducted by varying the weight average molecular weight of cationized chitosan and the concentration of the water-based fiber finish. In Examples 26-28, tests were conducted by varying the conditions for the heat treatment. In each of those tests, the results were good, and substantially no reduction took place in antimicrobial properties even after 100 washing cycles.

In each of Comparative Example 4 and Comparative Example 5, the water-based fiber finish was prepared in a form free of any metal compound. The prewashing antimicrobial properties were comparable with those of the examples, but after washing, antimicrobial properties were lost. In Comparative Example 6, the water-based fiber finish was prepared by changing the crosslinking agent to polyethylene glycol diglycidyl ether. Antimicrobial properties were good. When the water-based fiber finish employed in the test was left over until the following day, however, the solution became viscous in its entirety. Using the water-based fiber finish which had been left over until the following day, a fabric was finished and subsequent to a durability test against washing, was subjected to an antimicrobial test. However, no antimicrobial properties were observed.

INDUSTRIAL APPLICABILITY

As has been described above, the treatments of various metal materials with water-based, substrate treatment compositions according to the present invention can form undercoats excellent in the interlayer adhesion between resin coating layers such as coatings or films, solvent resistance and the corrosion resistance of the metal materials. Further, the water-based, substrate treatment compositions according to the present invention do not contain hexavalent chromium at all, so that they do not give much pollutant load on the environment and they assure good handling ease. The water-based, substrate treatment compositions according to the present invention are, therefore, considered to have extremely high value for their utility in industry.

Substrate treatment compositions according to the present invention are also useful as finishes for fibers. They can provide fibers with excellent antimicrobial properties together with superb washfastness.

The invention claimed is:

1. A water-based composition comprising components A, B and C:
    component A is at least one member selected from the group consisting of chitosan, a derivative thereof, and an acid salt thereof; wherein said derivative is a reaction product obtained by carboxylating, glycolizing, tosylating, sulfating, phosphatizing, etherifying or alkylating at least one group selected from the group consisting of a hydroxyl group and amino group of chitosan;
    component B is a metal compound comprising at least one metal selected from the group consisting of Ti, Zr, Hf, Mo, W, Se, Ce, Fe, V and trivalent Cr, and
    component C is an organic compound, wherein said organic compound is at least one member selected from the group consisting of a tribasic acid, a tetrabasic acid, and a pentabasic acid.

2. The water-based composition of claim 1, wherein said wherein said chitosan (A) is obtained by subjecting chitin to 60 to 100% mole % deacetylation.

3. The water-based composition of claim 1, wherein said component (B) is a metal oxide or hydroxide.

4. The water-based composition of claim 1, wherein said component (B) is an organic acid salt or inorganic acid salt.

5. The water-based composition of claim 1, wherein said component C is at least one selected from the group consisting of citric acid, butanetricarboxylic acid, propanetricarboxylic acid, trimellitic acid, ethylenediaminetetracarboxylic acid, 1,2,3,4-butanetetracarboxylic acid, diethylentriaminepentaacetate, tannic acid and phytic acid.

6. A substrate treatment method comprising:
    coating a substrate which is to be treated, at a surface thereof with the water-based composition of claim 1,
    optionally rinsing the surface of the substrate with water subsequent to said coating, and
    heating and drying said substrate in a temperature range of from 80° C. to 300° C.;
    wherein
    a dry coat weight of said component A to said surface of said treated substrate is in a range of from 1 to 500 mg/m$^2$ calculated as chitosan; and a dry coat weight of said component B to said surface of said treated substrate is in a range of from 1 to 500 mg/m$^2$ calculated as said metal.

7. A coated metal comprising:
    a metal substrate, wherein said metal substrate is aluminum, magnesium, copper, iron, zinc, nickel, or an alloy thereof; and
    a coating, wherein said coating has been formed by applying to said metal substrate the water-based composition of claim 1.

* * * * *

UNITED STATES PATENT AND TRADEMARK OFFICE
CERTIFICATE OF CORRECTION

PATENT NO. : 7,294,362 B2  Page 1 of 1
APPLICATION NO. : 10/500892
DATED : November 13, 2007
INVENTOR(S) : Kazuya Tanaka et al.

It is certified that error appears in the above-identified patent and that said Letters Patent is hereby corrected as shown below:

On the title page, Item (73), the Assignee information is incorrect. Item (73) should read:

-- Assignee: Nihon Parkerizing Co., Ltd., Tokyo (JP); Dainichiseika Color & Chemicals Mfg. Co., Ltd., Tokyo, (JP) --

Signed and Sealed this

Twenty Second Day of April, 2008

JON W. DUDAS
*Director of the United States Patent and Trademark Office*